(No Model.) 8 Sheets—Sheet 1.

C. T. WORDSWORTH, E. WISEMAN & J. HOLROYD.
MOTOR WORKED BY HYDROCARBON OR OTHER GASES.

No. 588,672. Patented Aug. 24, 1897.

Fig. 1.

Witnesses

Inventors
C. T. Wordsworth,
E. Wiseman,
J. Holroyd,
By their Attorneys (No Model.) 8 Sheets—Sheet 3.

C. T. WORDSWORTH, E. WISEMAN & J. HOLROYD.
MOTOR WORKED BY HYDROCARBON OR OTHER GASES.

No. 588,672. Patented Aug. 24, 1897.

Fig. 3.

Witnesses
Inventors

(No Model.) 8 Sheets—Sheet 4.

C. T. WORDSWORTH, E. WISEMAN & J. HOLROYD.
MOTOR WORKED BY HYDROCARBON OR OTHER GASES.

No. 588,672. Patented Aug. 24, 1897.

Witnesses

Inventors (No Model.) 8 Sheets—Sheet 5.
C. T. WORDSWORTH, E. WISEMAN & J. HOLROYD.
MOTOR WORKED BY HYDROCARBON OR OTHER GASES.

No. 588,672. Patented Aug. 24, 1897.

UNITED STATES PATENT OFFICE.

CHRISTOPHER THOMAS WORDSWORTH, OF MANCHESTER, EDMUND WISEMAN, OF LUTON, AND JOHN HOLROYD, OF LONDON, ENGLAND.

MOTOR WORKED BY HYDROCARBON OR OTHER GASES.

SPECIFICATION forming part of Letters Patent No. 588,672, dated August 24, 1897.

Application filed November 23, 1896. Serial No. 613,177. (No model.)

*To all whom it may concern:*

Be it known that we, CHRISTOPHER THOMAS WORDSWORTH, residing at 4 Corporation Street, Manchester, in the county of Lancaster, EDMUND WISEMAN, residing at Cheapside, Luton, in the county of Bedford, and JOHN HOLROYD, residing at 13 Alleyn Terrace, Park Road, West Dulwich, London, in the county of Surrey, England, engineers, subjects of the Queen of Great Britain, have invented certain new and useful Improvements in Motors Worked by Hydrocarbon or other Gases, of which the following is a specification.

This invention relates to motors to be worked by the combustion within them of the vapor of a hydrocarbon liquid, such as petroleum, and especially to the class of engines in which the products of combustion are passed from cylinder to cylinder.

In the accompanying drawings.

The engine shown in Figs. 1 to 8 is provided with six cylinders—four high-pressure cylinders 1, working substantially in the manner described in my application for patent, Serial No. 613,176, filed simultaneously herewith, but with certain differences hereinafter stated, and two low-pressure cylinders 5. The high-pressure cylinders are provided with pistons P, whose rods $p$ are connected with a cross-head R, which is connected by links $r$ to crank-levers 2, which by connecting-rods 3 impart motion to a crank $3^a$ on the main shaft 4. This shaft is mounted in suitable bearings and carries a fly-wheel S.

The low-pressure cylinders 5 are provided with pistons P', whose rods $p'$ are connected to a cross-head R', which is connected by links $r'$ with the bell-crank lever 6, and by another connecting-rod 7 this bell-crank lever 6 drives another crank $3^b$ on the main shaft 4.

Each low-pressure cylinder works in connection with two of the high-pressure cylinders.

Figure 1:
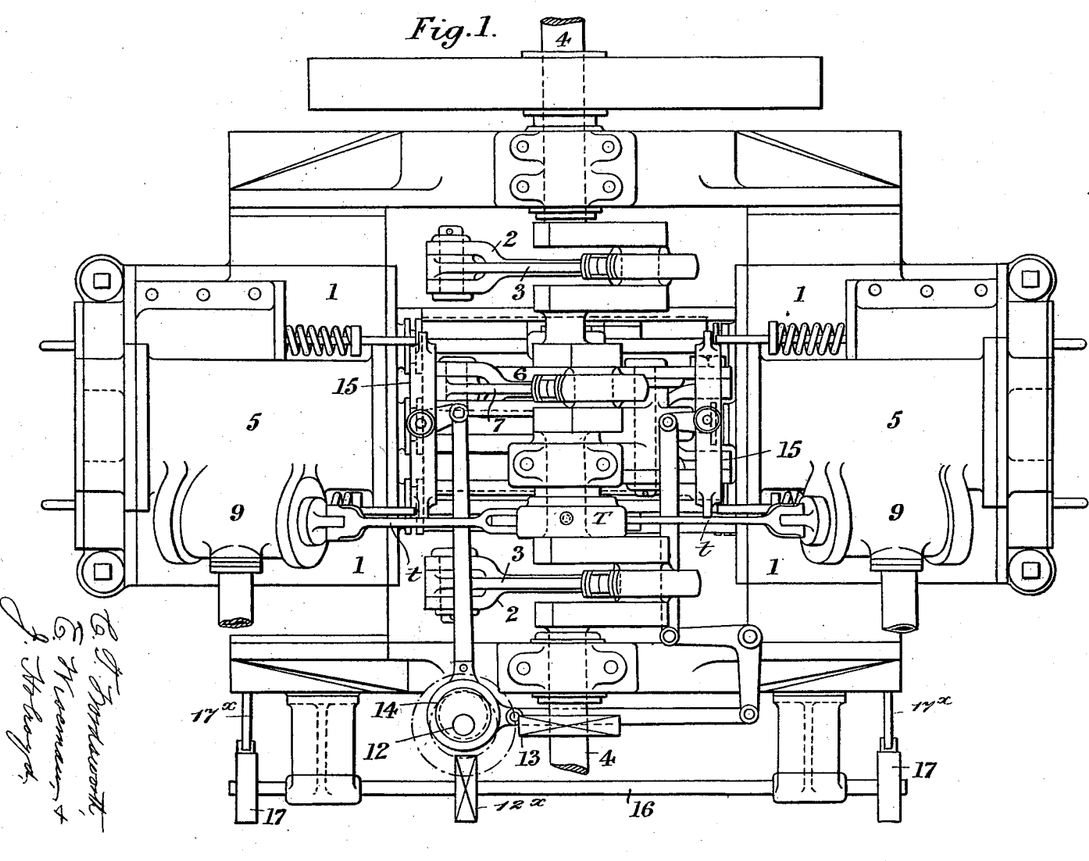
Figure 1 is a plan, Fig. 2 an end elevation, and Fig. 3 a side elevation, partly in section, of an engine with six cylinders constructed in accordance with our invention. The section in the last-mentioned figure is taken on the line D E F in Fig. 2.
Figure 2:
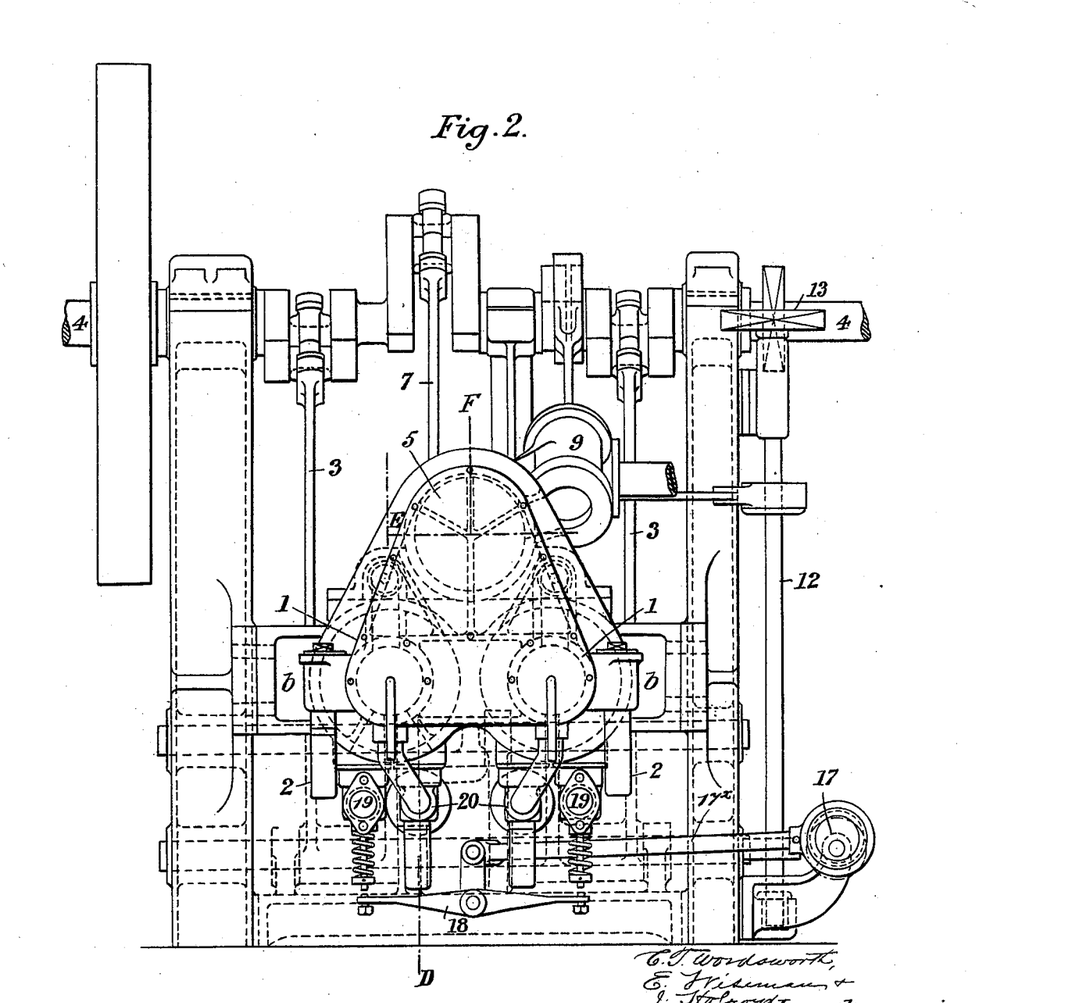
Figure 3:
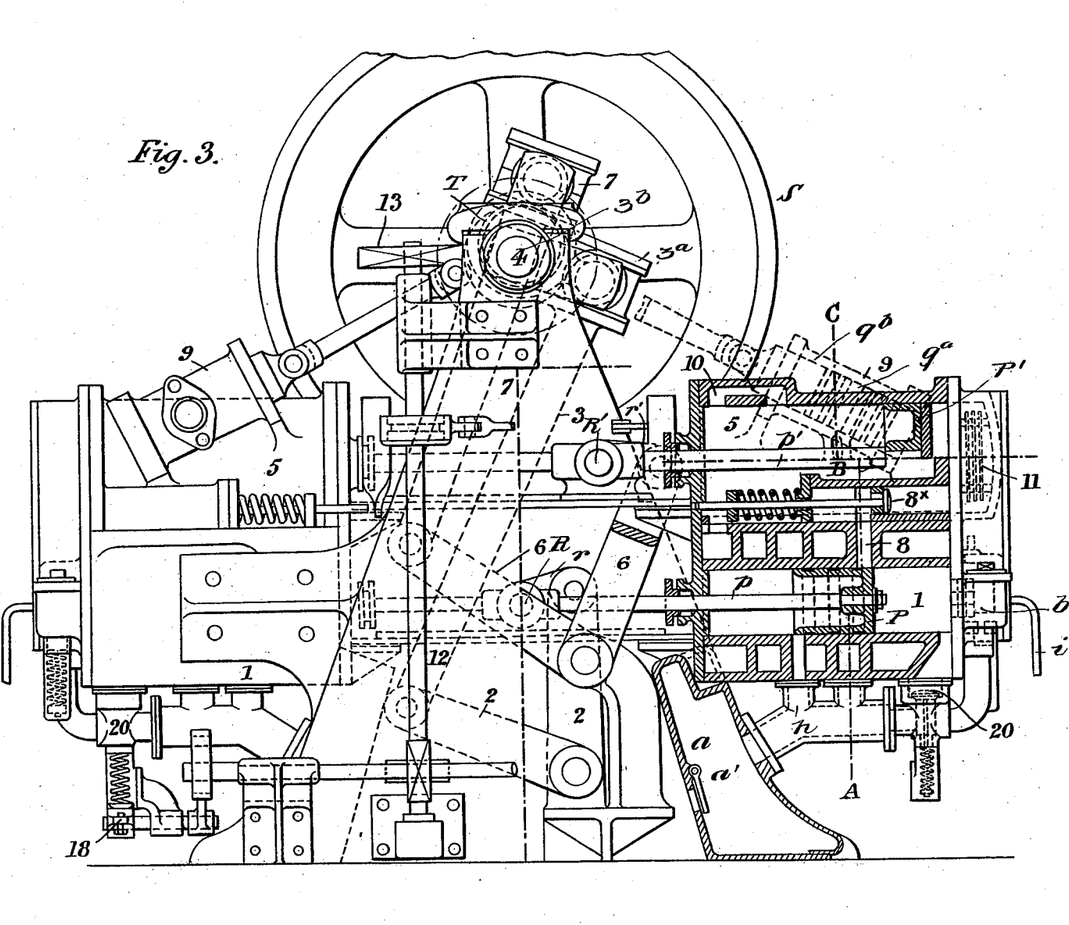
Figure 4:
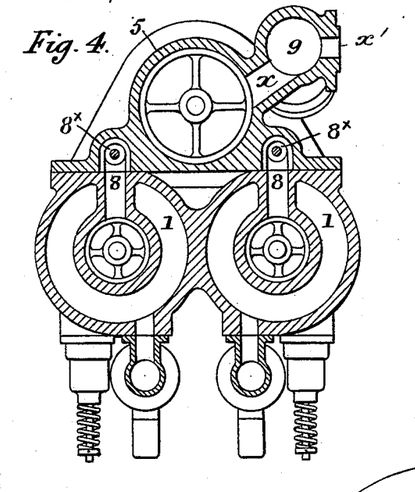
Fig. 4 is a section taken on the line A B C in Fig. 3.
Figures 5, 6:
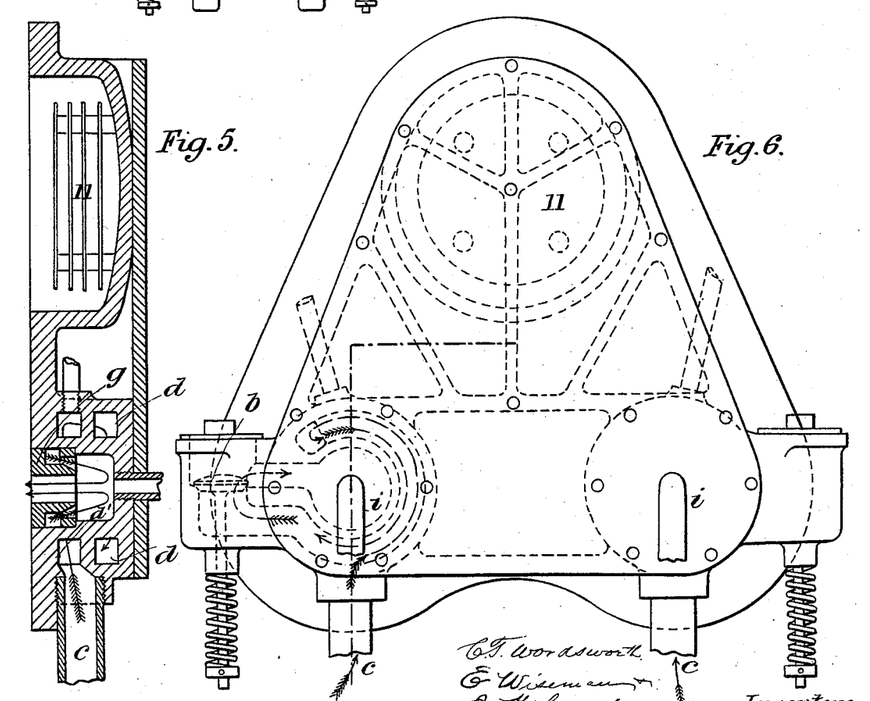
Fig. 5 is a section of the end cover of the cylinder on an enlarged scale.
Fig. 6 is an elevation of the same.
Figure 7:
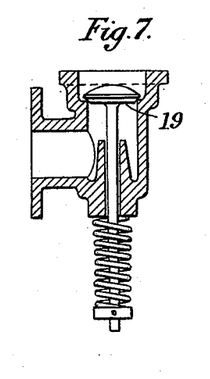
Fig. 7 is a section of one of the exhaust-valves.
Figure 8:
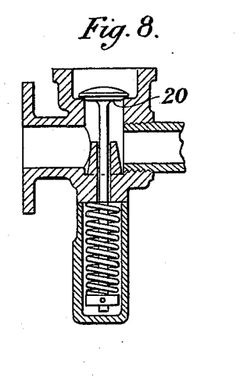
Fig. 8 shows one of the air-admission valves.
Figure 9:
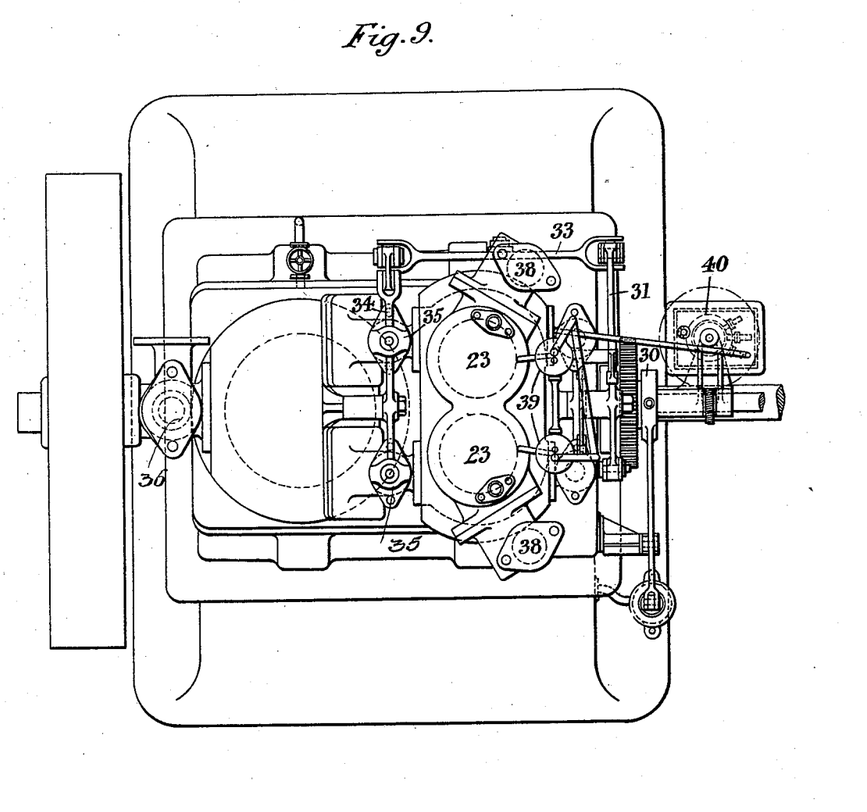
Fig. 9 is a plan of a three-cylinder engine of a modified form embodying our improvements.
Figure 10:
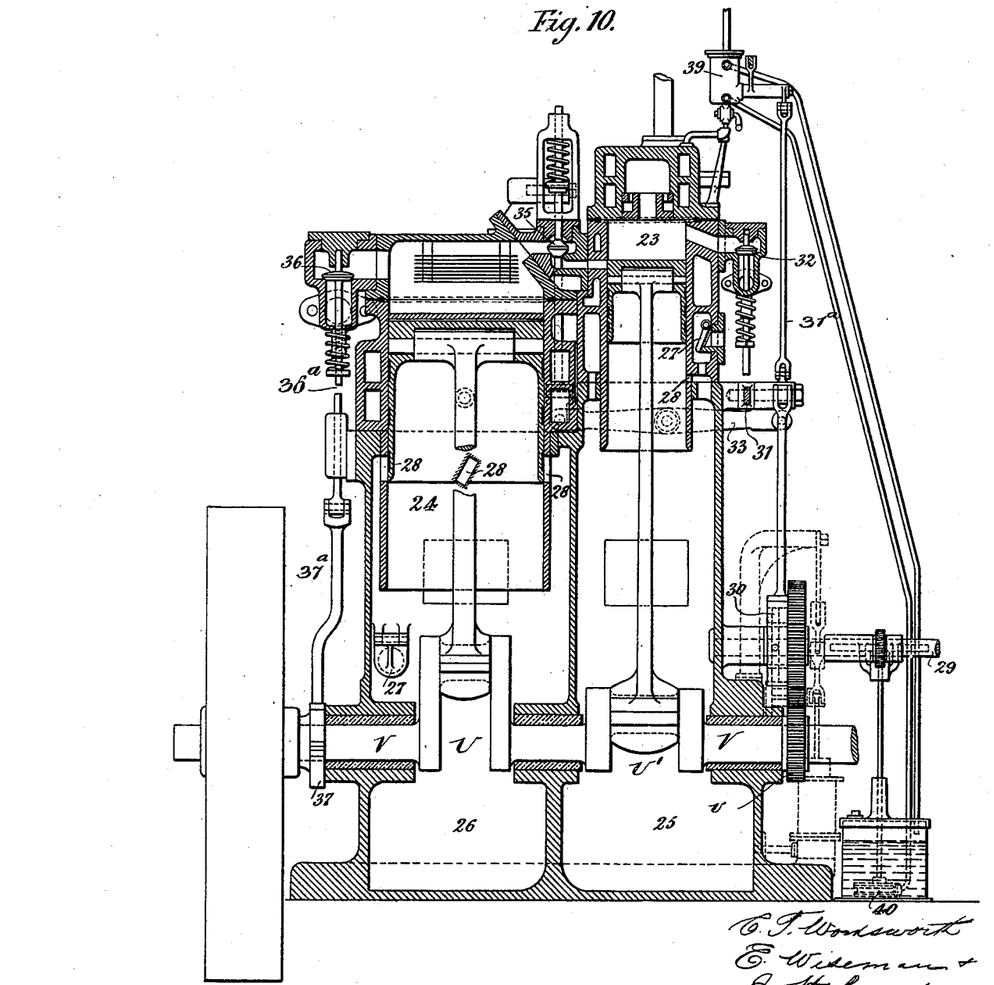
Fig. 10 is a front elevation, and Fig. 11 a side elevation, one-half in section, of the same.
Figure 11:
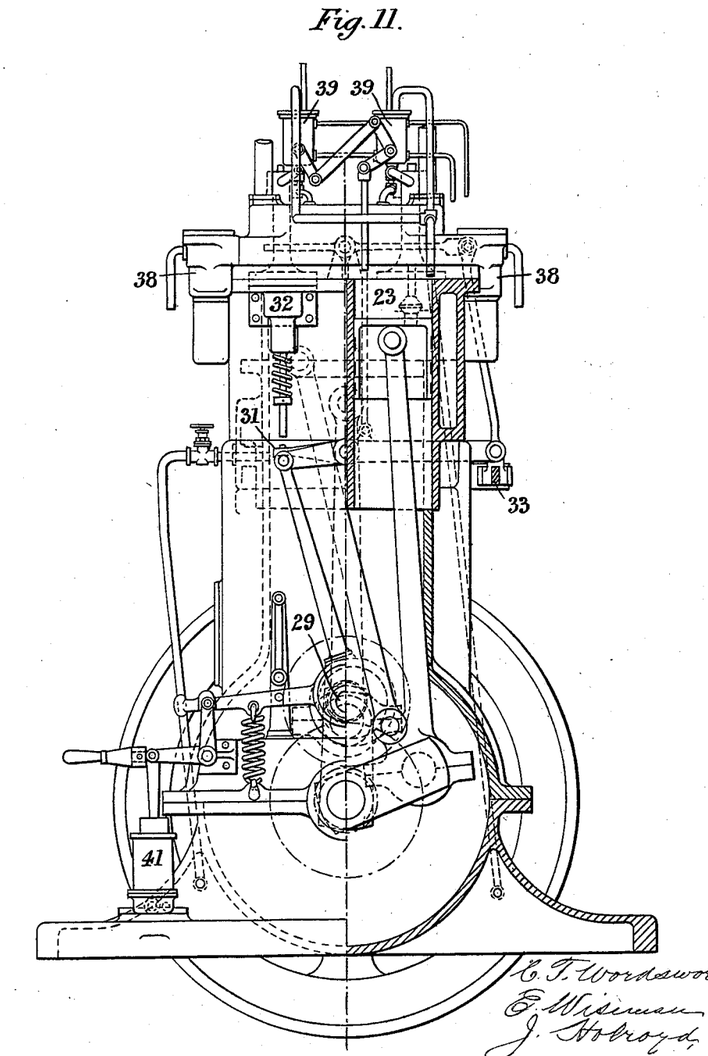
Figures 12, 13, 14:
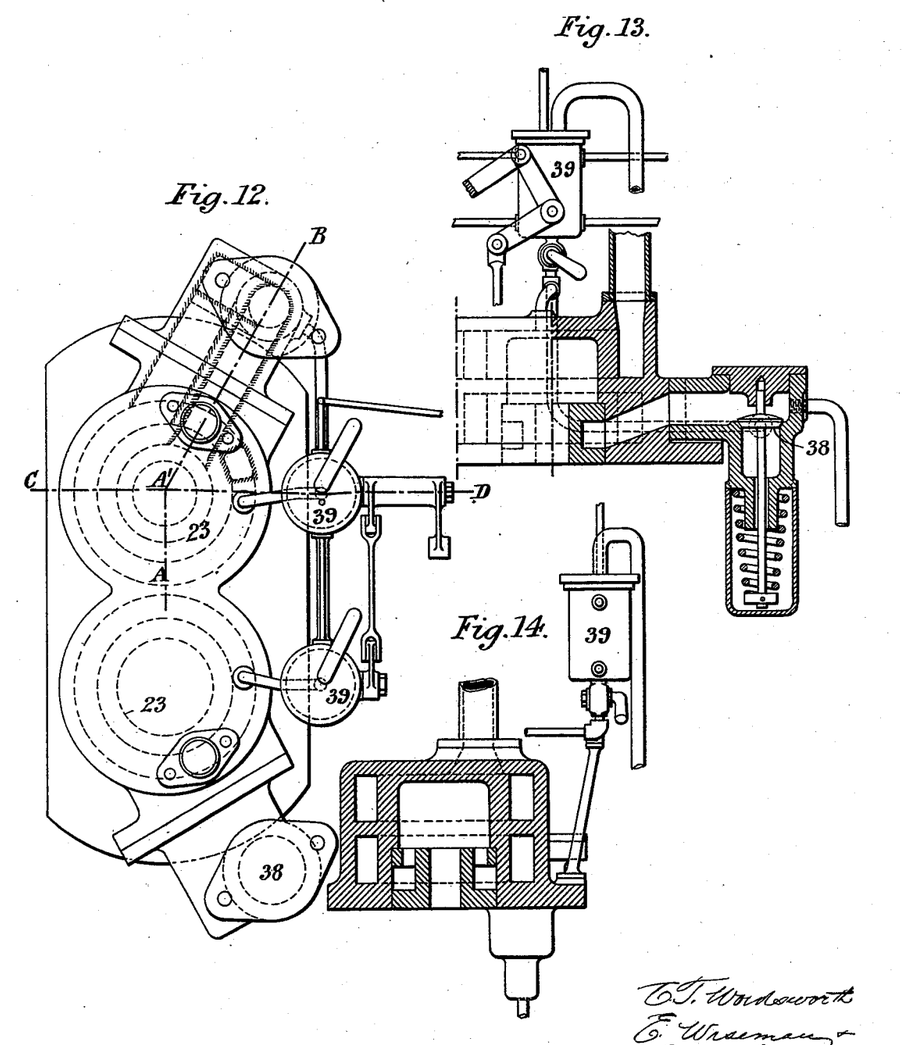
Fig. 12 shows, on a larger scale, a plan of the principal part of the engine.
Figs. 13 and 14 are sections of the same on the lines A A' B and C D, respectively.

As soon as the charge is ignited in one of the high-pressure cylinders the greater part of it passes by the port 8 and the intermediate valve $8^\times$ into the low-pressure cylinder 5, the piston of which at this time is at or about the outer end of its stroke, as shown in Fig. 3. The hot products of combustion meet air previously compressed in the low-pressure cylinder, and the pressure of this air so heated then drives the piston to the farther end of its stroke, work being done on the crank-shaft.

Each low-pressure cylinder is provided with an exit-valve 9, which consists of a double piston $9^a$, with packing-rings working in a cylindrical casing $9^b$, having ports $x$ $x'$ on its opposite sides, (see Fig. 4,) by which the gases from the low-pressure cylinder pass out when the double piston-valve covers the ports. This exhaust-valve 9 opens at or about the time that the piston arrives at the inner end of its stroke, and then compressed air from the reservoir $a$ passes the piston by the passage 10, (see Fig. 3,) driving the products of combustion before it out through the exhaust-valve 9. The exhaust-valve then closes, leaving the low-pressure cylinder full of air at the same pressure as that in the reservoir. By the return movement of the piston this air is further compressed. Then, as before, the cylinder receives hot gases, but this time from the other of the pair of high-pressure cylinders, and the stroke is repeated.

The low-pressure cylinders are fitted with disks 11, which take up the heat of the gases from the high-pressure cylinder and diffuse it among the charge. The disks 11 are shown more clearly in Figs. 5 and 6. The exhaust-valves 9 of the low-pressure cylinders are worked directly by connections $t$ with an eccentric T on the crank-shaft 4. The intermediate valves $8^\times$ are actuated from a vertical shaft 12, which receives motion from the crank-shaft 4 by skew-wheels 13 at half the speed of the crank-shaft. The vertical shaft 12 has an eccentric 14 upon it, and this is connected by rods $13^a$ to rocking levers 15, the ends of which alternately press upon the stems $15^a$ of the valves $8^\times$ and move said valves from their seats. The vertical shaft 12, by skew-wheels $12^\times$, drives a horizontal shaft 16, on which are eccentrics 17, connected by rods $17^\times$ with the rocking levers 18, which open the exhaust-valves 19. The admission-valves in this engine open automatically by the suction of the pistons. Air is compressed by the pistons into the reservoirs $a$, and this air is utilized in the way described in my application for patent before mentioned. Some of it also passes, if needed by the valves 20, into the high-pressure cylinders. One of the valves 20 is illustrated in detail in Fig. 8.

In the engine above described the power is applied to the crank-shaft through cranks set at an angle the one to the other. This is an advantageous feature and tends to uniformity in the application of power.

The exact details in the construction and operation of the engine are not important. However, a more detailed description of some of the apparatus may be useful.

It will be observed by reference to Fig. 3 that each air-reservoir $a$ is in permanent connection with the inner ends of all three of the cylinders, forming a group. It has an inlet-valve $a'$, which opens freely to admit air, but during the greater part of the stroke of the pistons the valve will remain closed and the pressure in the reservoir will be somewhat above atmospheric. The high-pressure pistons in the cylinders 1 1 draw air from this reservoir when they travel inward. The air passes through a pipe $c$ (see Figs. 5 and 6) and becomes highly heated by passing first in one direction and then in the other around the spiral passages $d$ $d'$ in the cylinder-cover.

$e$ is a pipe which delivers into the pipe $d$ a measured quantity of petroleum to each stroke. The heated air and petroleum together reach another inlet or non-return valve $b$, which they pass and so reach the perforated disk $g$ and enter the cylinder as indicated by the arrows in Fig. 5. Further, air enters the cylinder direct from the air vessel or reservoir $a$ by the inlet-valve 20. So when the piston in the cylinder 1 reaches the inner end of its stroke the charge in front of it has the same amount of compression as the air in the reservoir $a$. Next, during the outward stroke of the piston, the charge of air and vapor becomes highly compressed and in this state the heat of the disk $g$ ignites the charge. In the second inward stroke of the piston as it passes over the port marked 8 a great portion of the ignited charge passes by that port past the valve $8^\times$ into the low-pressure cylinder, as before explained. Toward the end of this inward stroke of the high-pressure piston it passes over another port $h$, thereby opening a passage leading to the air-reservoir $a$, and the exit-valve 19 being at this time open air rushes from the reservoir into the cylinder, sweeping the products of combustion before it.

$i$ is an igniting-tube used only in starting the engine. It is then heated by a lamp-flame.

In the engine shown in Figs. 9 to 12 the cylinders are arranged vertically. In other respects the engine is very similar to that previously described. There are two high-pressure cylinders 23 23 supplying alternately products of combustion to one low-pressure cylinder 24. There are also two cranks U U' at a suitable angular distance apart, one connected with the high-pressure pistons and the other with the low-pressure piston. These cranks are contained in separate air-tight chambers 25 26, which serve as compressed-air reservoirs, the air entering them through non-return valves at 27 and passing into the cylinders when the ports 28 in their sides are uncovered by the pistons.

The valve motions are obtained in the following manner: A pinion $v$ on the crank-shaft V drives at one-half its speed the horizontal shaft 29, and an eccentric 30 on this shaft gives motion to the rocking levers 31, which open alternately the two exit-valves 32 32.

33 is a cross-lever which couples the levers 31 with another rocking lever 34, and this lever 34 serves to open alternately the intermediate valves 35 35. The exit or exhaust valve 36 of the low-pressure cylinder is controlled by the eccentric 37 on the main shaft of the engine, which operates a rod $37^a$, acting on the end $36^a$ of the valve 36.

38 38 are inlet-valves opening automatically. The lever 31 by connections $31^a$, as shown, also gives motion to the apparatus 39, which delivers the measured quantities of petroleum. This apparatus need not be described in detail, as it is similar to that shown and described in our application for patent filed simultaneously herewith, Serial No. 613,176. If desired, a governor may be provided to control the delivery of the charge. The shaft 29 also drives the rotary pump 40 for supplying the petroleum, and the air-pump 41, which compresses the air to drive the measured quantities of petroleum into the engine. This apparatus is also shown in our application, Serial No. 613,176, before referred to. The air-pump by the arrangement shown can be thrown out of gear when not required.

We claim as our invention—

1. A hydrocarbon-motor in which the cylinders are arranged in a group or groups of three, the groups comprising a pair of high-pressure cylinders and a low-pressure cylinder, all in close proximity, a driving-shaft provided with cranks set at different angles, connections between the cranks and the cylinders, and valve mechanism constructed, operated and arranged so that the high-pressure cylinders are successively charged and fired at alternate strokes and immediately after firing in each case a portion of the ignited charge is passed by a port in the side of the high-pressure cylinder into the low-pressure cylinder and mingles with air previously compressed by the piston of this cylinder and is then propelled by said charge in the low-pressure cylinder.

2. In a hydrocarbon-motor the combination of a series of high-pressure cylinders and low-pressure cylinders arranged in groups of three, each group containing a pair of high-pressure cylinders and a low-pressure cylinder, all in close proximity, a shaft provided with cranks arranged at different angles to each other to which the pistons of the several cylinders are connected, valves for admission and exhaust, and means for operating the valves so that the high-pressure cylinders are successively charged and fired at alternate strokes and immediately after firing in each case a portion of the ignited charge is passed by a port in the side of the high-pressure cylinder into the low-pressure cylinder and mingles with air previously compressed by the piston in this cylinder.

3. In a hydrocarbon-motor, the combination of a series of high-pressure cylinders and low-pressure cylinders arranged in groups of three, each group containing a pair of high-pressure cylinders and a low-pressure cylinder, a shaft provided with cranks all arranged at different angles to each other and to which the pistons of the several cylinders are connected, valve mechanism for admitting an explosive mixture to one of the high-pressure cylinders, a passage for leading the products of combustion from this high-pressure cylinder to the low-pressure cylinder, means for admitting air to said high-pressure cylinder to expel the products of combustion therefrom and to charge the high-pressure cylinder with air while the piston of the low-pressure cylinder is moving forward, means for permitting the escape of the products of combustion from the low-pressure cylinder, means for admitting air thereto to expel the products of combustion and to charge the low-pressure cylinder with air, means for confining the charge of air in the low-pressure cylinder during the back stroke of its piston, means for admitting an explosive mixture to the second high-pressure cylinder, and means for then causing said high-pressure cylinder and the low-pressure cylinder to operate in the same manner as the other high-pressure cylinder, and said low-pressure cylinder, substantially as set forth.

4. In a hydrocarbon-motor the combination of a series of high-pressure cylinders and low-pressure cylinders, arranged in groups of three, each group containing a pair of high-pressure cylinders and a low-pressure cylinder, a shaft provided with cranks arranged at different angles to each other and to which the pistons of the several cylinders are connected, means for admitting an explosive charge to one of the high-pressure cylinders for firing the same and causing the piston thereof to move forward, means for transferring the explosive mixture from said high-pressure cylinder to the low-pressure cylinder while the piston of said high-pressure cylinder is moving forward and which causes the piston of the low-pressure cylinder to move forward simultaneously with the piston of said high-pressure cylinder, means for expelling the products of combustion from the low-pressure cylinder after the piston of the high-pressure cylinder has commenced to move on its return stroke, and means for admitting an explosive mixture to the low-pressure cylinder from the second high-pressure cylinder after the piston of the low-pressure cylinder has reached, or has nearly reached, the limit of its return stroke.

CHRISTOPHER THOMAS WORDSWORTH.
EDMUND WISEMAN.
JOHN HOLROYD.

Witnesses:
ROBERT B. RANSFORD,
FRED C. HARIES.